US007466893B2

(12) United States Patent
Higuchi et al.

(10) Patent No.: US 7,466,893 B2
(45) Date of Patent: Dec. 16, 2008

(54) CURABLE RESIN COMPOSITION FOR LIGHT GUIDE FORMATION, CURABLE DRY FILM FOR LIGHT GUIDE FORMATION, CURED RESIN AND LIGHT GUIDE

(75) Inventors: Takahiro Higuchi, Hiratsuka (JP); Genji Imai, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 308 days.

(21) Appl. No.: 10/589,723

(22) PCT Filed: Feb. 24, 2005

(86) PCT No.: PCT/JP2005/003026

§ 371 (c)(1), (2), (4) Date: Aug. 17, 2006

(87) PCT Pub. No.: WO2005/081024

PCT Pub. Date: Sep. 1, 2005

(65) Prior Publication Data

US 2008/0226245 A1 Sep. 18, 2008

(51) Int. Cl.
*G02B 6/00* (2006.01)

(52) U.S. Cl. ....................................... 385/143; 385/145

(58) Field of Classification Search ....................... None
See application file for complete search history.

(56) References Cited

U.S. PATENT DOCUMENTS

2005/0171318 A1 * 8/2005 Okuhira et al. ............... 528/34

FOREIGN PATENT DOCUMENTS

| | | |
|---|---|---|
| JP | 9-124793 | 5/1997 |
| JP | 2001-506372 | 5/2001 |
| JP | 2002-275445 | 9/2002 |
| JP | 2002-277664 | 9/2002 |
| JP | 2003-202437 | 7/2003 |
| JP | 2004-10849 | 1/2004 |
| WO | WO98/26315 | 6/1998 |

* cited by examiner

*Primary Examiner*—Sung H Pak
(74) *Attorney, Agent, or Firm*—Kratz, Quintos & Hanson, LLP

(57) ABSTRACT

Disclosed is an optical waveguide-forming curable resin composition and optical waveguide-forming curable dry film which are capable of forming cured resin articles that have high heat resistance, excellent mechanical strength and high transparency, and possess properties required for forming optical waveguides, such as low thermal expansion, low transmission loss, etc.

The present invention provides a curable resin composition for forming an optical waveguide, the composition comprising a hydrolyzable silyl-containing silane-modified epoxy resin (A) having an average of at least one hydrolyzable silyl group and an average of at least one epoxy group per molecule; and a resin (B) having, per molecule, an average of at least one functional group that is reactive with an epoxy group; and an optical waveguide-forming curable dry film formed using the resin composition.

14 Claims, No Drawings

CURABLE RESIN COMPOSITION FOR LIGHT GUIDE FORMATION, CURABLE DRY FILM FOR LIGHT GUIDE FORMATION, CURED RESIN AND LIGHT GUIDE

TECHNICAL FIELD

The present invention relates to a curable resin composition for forming an optical waveguide, a curable dry film for forming an optical waveguide, a cured resin article and an optical waveguide.

BACKGROUND ART

In recent years, optical waveguides have been attracting attention as optical transmission media that meet the demand for increased capacity and speed of information processing in optical communication systems, computers, etc.

Quartz waveguides are representative optical waveguides, but have problems in that they require special production facilities, long production times, etc.

As substitutes for such quartz waveguides, organic polymer optical waveguides which are free from the above problems have been developed. Organic polymer optical waveguides are produced by forming a film of an optical waveguide-forming resin composition using a spin coater on a rigid substrate made of a rigid material such as a resin impregnated with a ceramic, glass, glass epoxy or like reinforcing material, and then curing the film.

When producing an organic polymer optical waveguide using such a resin composition, because of the difference in the coefficient of thermal expansion between the resin composition and the substrate, heat treatment causes cracks in the organic polymer optical waveguide, which has a high coefficient of thermal expansion, or peeling of the optical waveguide from the substrate, thereby producing transmission loss. JP 2002-277664 A discloses an optical waveguide-forming resin composition containing inorganic particles to reduce the thermal expansion of the composition.

However, optical waveguides formed using such a resin composition have insufficient mechanical strength since the inorganic particles have poor adhesion to the organic polymeric material. Further, the composition cannot be formed into a dry film and is thus limited in application. Furthermore, since the inorganic particles scatter light, the resin composition also has problems in that it cannot form a transparent optical waveguide and in that the organic polymeric material itself has insufficient heat resistance.

DISCLOSURE OF INVENTION

Problems to be Solved by the Invention

An object of the present invention is to provide an optical waveguide-forming curable resin composition and an optical waveguide-forming curable dry film that are capable of forming, without using inorganic particles or the like, a cured resin article having high heat resistance, excellent mechanical strength and high transparency, and properties required for forming optical waveguides, such as low thermal expansion, low transmission loss, etc.

Means for Solving the Problems

The present invention provides the following curable resin composition for forming an optical waveguide, curable dry film for forming an optical waveguide, cured resin article and optical waveguide.

1. A curable resin composition for forming an optical waveguide, the composition comprising a hydrolyzable silyl-containing silane-modified epoxy resin (A) having an average of at least one hydrolyzable silyl group and an average of at least one epoxy group per molecule; and a resin (B) having, per molecule, an average of at least one functional group that is reactive with an epoxy group.

2. The curable resin composition according to item 1, wherein the hydrolyzable silyl-containing silane-modified epoxy resin (A) is a reaction product of a hydroxy-containing epoxy resin with a hydrolyzable silane compound and/or a condensate thereof.

3. The curable resin composition according to item 1, wherein the resin (B) is a carboxy-containing resin.

4. A cured resin article for forming an optical waveguide, the article being obtained by applying the curable resin composition according to item 1 to a substrate, performing a first heating at a temperature at which hydrolyzable silyl groups in the hydrolyzable silyl-containing silane-modified epoxy resin (A) are polymerized through hydrolysis and condensation, and performing a second heating at a temperature at which epoxy groups in the resin (A) react with functional groups in the resin (B).

5. A curable dry film for forming an optical waveguide, the dry film being formed using an optical waveguide-forming curable resin composition comprising a hydrolyzable silyl-containing silane-modified epoxy resin (A) having an average of at least one hydrolyzable silyl group and an average of at least one epoxy group per molecule, and a resin (B) having, per molecule, an average of at least one functional group that is reactive with an epoxy group.

6. The curable dry film according to item 5 which has a softening temperature within a range of 0° C. to 300° C.

7. A cured resin article for forming an optical waveguide, the article being obtained by bonding the dry film according to item 5 to a substrate, performing a first heating at a temperature at which hydrolyzable silyl groups in the hydrolyzable silyl group-containing silane-modified epoxy resin (A) are polymerized through hydrolysis and condensation, and performing a second heating at a temperature at which epoxy groups in the resin (A) react with functional groups in the resin (B).

8. An optical waveguide comprising a lower cladding layer (I), a core (II) and an upper cladding layer (III), wherein at least one of (I), (II) and (III) is formed using the curable resin composition according to item 1.

9. The optical waveguide according to item 8, wherein the relative refractive index difference between the core (II) and whichever of the lower cladding layer (I) and upper cladding layer (III) that has the higher refractive index, is at least 0.1%.

10. An optical waveguide comprising a lower cladding layer (I), a core (II) and an upper cladding layer (III), wherein at least one of (I), (II) and (III) is formed using the dry film according to item 5.

11. The optical waveguide according to item 10, wherein the relative refractive index difference between the core (II) and whichever of the lower cladding layer (I) and upper cladding layer (III) that has the higher refractive index, is at least 0.1%.

12. An optical waveguide comprising a lower cladding layer (I), a core (II) and an upper cladding layer (III), wherein at least one of (I), (II) and (III) is formed using the cured resin article according to item 4.

13. The optical waveguide according to item 12, wherein the relative refractive index difference between the core (II)

and whichever of the lower cladding layer (I) and upper cladding layer (III) that has the higher refractive index, is at least 0.1%.

14. An optical waveguide comprising a lower cladding layer (I), a core (II) and an upper cladding layer (III), wherein at least one of (I), (II) and (III) is formed using the cured resin article according to item 7.

15. The optical waveguide according to item 14, wherein the relative refractive index difference between the core (II) and whichever of the lower cladding layer (I) and upper cladding layer (III) that has the higher refractive index, is at least 0.1%.

The present invention is described below in detail.

The curable resin composition for forming an optical waveguide according to the present invention comprises a hydrolyzable silyl-containing silane-modified epoxy resin (A) having an average of at least one hydrolyzable silyl group and an average of at least one epoxy group per molecule (hereinafter sometimes referred to simply as Resin (A)); and a resin (B) having, per molecule, an average of at least one functional group that is reactive with an epoxy group (hereinafter sometimes referred to simply as Resin (B)).

Hydrolyzable Silyl-containing Silane-modified Epoxy Resin (A)

Resin (A) preferably has a number average molecular weight of 600 to 200000, and more preferably 700 to 10000. Resin (A) has an average of at least one, and preferably at least two, hydrolyzable silyl groups per molecule, and an average of at least one, and preferably at least two, epoxy groups per molecule. Number average molecular weights of less than 600 result in low heat resistance, poor processability, etc., whereas number average molecular weights of more than 200000 result in low transparency, and poor workability for bonding, application and the like. When the average number of hydrolyzable silyl groups per molecule is less than 1, low heat resistance results. When the average number of epoxy groups per molecule is less than 1, low heat resistance, poor processability, etc. result.

Resin (A) can be produced by, for example, reacting a hydroxy-containing epoxy resin with a hydrolyzable silane compound and/or a condensate thereof.

Hydroxy-containing Epoxy Resin

The hydroxy-containing epoxy resin is not limited as long as it is an epoxy resin containing hydroxy groups that undergo a condensation reaction with a hydrolyzable silane compound and/or a condensate thereof. Bisphenol-type epoxy resins obtained by reacting bisphenol compounds with haloepoxides such as epichlorohydrin, β-methylepichlorohydrin, etc. are preferable in view of mechanical properties, chemical properties, electrical properties, versatility, etc.

Examples of bisphenol compounds include those obtained by reacting phenol with aldehydes and ketones such as formaldehyde, acetaldehyde, acetone, acetophenone, cyclohexanone, benzophenone, etc.; oxidation of dihydroxyphenyl sulfide with peracids; etherification of hydroquinones; etc.

Usable hydroxy-containing epoxy resins include halogenated bisphenol-type epoxy resins derived from halogenated phenols such as 2,6-dihalophenol; phosphorus-modified bisphenol-type epoxy resins obtained by reactions with phosphorus compounds; and like flame-retardant resins. Examples of epoxy resins other than bisphenol-type epoxy resins include alicyclic epoxy resins obtained by hydrogenating bisphenol-type epoxy resins as mentioned above; hydroxy-containing epoxy resins obtained by reacting acids, amines or phenols with some of the epoxy groups in known hydroxy-containing epoxy resins such as mentioned below, to cause ring-opening of the epoxy groups. Known hydroxy-containing epoxy resins include novolac-type epoxy resins obtained by reacting haloepoxides with phenol novolac resins, cresol novolac resins, etc.; glycidyl ester-type epoxy resins obtained by reacting epichlorohydrin with polybasic acids such as phthalic acid, dimer acid, etc.; glycidyl amine-type epoxy resins obtained by reacting epichlorohydrin with polyamines such as diaminodiphenylmethane, isocyanuric acid, etc.; linear aliphatic epoxy resins and alicyclic epoxy resins obtained by oxidizing olefin bonds with peracids such as peracetic acid; biphenyl-type epoxy resins obtained by reacting biphenols with epichlorohydrin; etc.

In such hydroxy-containing epoxy resins, not all the molecules of the epoxy resins need contain hydroxy groups, as long as each resin, as a whole, contains hydroxy groups. Among hydroxy-containing epoxy resins as mentioned above, in view of versatility, bisphenol-type epoxy resins are preferable, and bisphenol A-type epoxy resins, which are obtained using bisphenol A as a bisphenol compound, are inexpensive and particularly preferable.

Preferable bisphenol-type epoxy resins include those having an epoxy equivalent of 230 g/eq to 1000 g/eq, and a number average molecular weight of 460 to 2000. Bisphenol-type epoxy resins with epoxy equivalents of less than 230 g/eq are not preferable because such resins have only a small number of hydroxy groups to react with a hydrolyzable silane compound and/or a condensate thereof, and thus the obtained hydrolyzable silyl-containing silane-modified epoxy resin contains a large proportion of epoxy compound without hydroxy groups, resulting in a high coefficient of thermal expansion of the epoxy resin-silica hybrid cured product. Bisphenol-type epoxy resins with epoxy equivalents of more than 1000 g/eq are also not preferable because such resin contain too many hydroxy groups, which are likely to cause gelation by reaction with the hydrolyzable silane compound and/or condensate thereof.

Hydrolyzable Silane Compound and Condensate Thereof

Hydrolyzable silane compounds are compounds containing hydrolyzable silane group(s). Hydrolyzable silane groups encompass groups in which hydrolyzable group(s) (lower alkoxy group having about 1 to about 3 carbon atoms, and acyl, acetoxy, butanoxime and like groups) are directly bonded to a silicon atom; hydroxysilyl groups; etc.

Examples of hydrolyzable silane compounds include compounds having tetrafunctional silicon structural units, compound having trifunctional silicon structural units, and compounds having difunctional silicon structural units.

Examples of compounds having tetrafunctional silicon structural units include tetramethoxysilane, tetraethoxysilane, tetrapropoxysilane, tetrabutoxysilane, dimethoxydiethoxysilane, tetraacetoxysilane, etc. Condensates of such compounds are also usable. The degree of condensation of such condensates is preferably 2 to 400, and more preferably 3 to 300.

Examples of compounds having trifunctional silicon structural units include trimethoxymethylsilane, trimethoxyethylsilane, trimethoxypropylsilane, trimethoxybutylsilane, trimethoxyphenylsilane, triethoxymethylsilane, triethoxyethylsilane, triethoxybutylsilane, triethoxyphenylsilane, tripropoxymethylsilane, tripropoxypropylsilane, tripropoxyphenylsilane, tributoxyphenylsilane, vinyltriethoxysilane, vinyltrimethoxysilane, vinyltris(methoxyethoxy)silane, γ-methacryloyloxypropyltrimethoxysilane, 2-styrylethyltrimethoxysilane, β-(3,4-epoxycyclohexyl)ethyltrimethoxysilane, γ-glycidoxypropyltrimethoxysilane, etc.

Condensates of such compounds are also usable. The degree of condensation of such condensates is preferably 2 to 400, and more preferably 3 to 300.

Examples of compounds having difunctional silicon structural units include methoxytrimethylsilane, methoxytriethylsilane, methoxymethyldiethylsilane, ethoxytrimethylsilane, ethoxytriethylsilane, ethoxytriphenylsilane, propoxytrimethylsilane, propoxytripropylsilane, butoxytributylsilane, phenoxytriphenylsilane and like monoalkoxysilanes; dimethoxydimethylsilane, dimethoxydiethylsilane, dimethoxydiphenylsilane, diethoxydimethylsilane, diethoxydiethylsilane, diethoxydiphenylsilane, dipropoxydimethylsilane, dipropoxydiethylsilane, dipropoxydipropylsilane, dipropoxydiphenylsilane, dibutoxydimethylsilane, dibutoxydiethylsilane, dibutoxydibutylsilane, dibutoxydiphenylsilane and like dialkoxysilanes; etc. Condensates of such compounds are also usable. The degree of condensation of such condensates is preferably 2 to 400, and more preferably 3 to 300.

Such compounds having tetrafunctional silicon structural units (including condensates thereof), compounds having trifunctional silicon structural units (including condensates thereof), and compounds having difunctional silicon structural units (including condensates thereof) may be used singly or in combination.

Among such silane compounds mentioned above, at least one member selected from the group consisting of tetraalkoxysilanes, alkyltrialkoxysilanes, and condensates thereof is preferably used, since use of such a compound allows the condensation reaction to proceed rapidly. In particular, since methoxysilane compounds, when heated, form siloxane bonds (Si—O—Si) without hydrolysis and are converted into silica, the condensation reaction does not require addition of water. Further, when using a methoxysilane compound, it is unlikely that residual water causes cloudiness in the resin, or that shrinkage at the time of curing causes cracking, providing good handleability.

Resin (A) is produced by esterifying a hydroxy-containing epoxy resin as mentioned above with a hydrolyzable silane compound and/or condensate thereof as mentioned above via, for example, a dealcoholization reaction. The proportions of hydroxy-containing epoxy resin and hydrolyzable silane compound and/or condensate thereof are not limited. It is preferable that the weight ratio of the hydrolyzable silane compound and/or condensate thereof on a silica basis, relative to the hydroxy-containing epoxy resin, be 0.01 to 1.2. However, when the equivalent ratio of the hydrolyzable silane groups relative to the hydroxy groups in the hydroxy-containing epoxy resin is about 1 (when the amount of hydrolyzable silane groups is stoichiometrically equivalent to that of the hydroxy groups), it is likely that viscosity increase and/or gelation of the solution is likely to be caused by the progression of the dealcoholization and other reactions. Therefore, it is preferable to adjust the equivalent ratio to less than 1 or more than 1 so that one of the equivalent of the hydroxy groups in the hydroxy-containing epoxy resin and the equivalent of the alkoxy groups in the hydrolyzable silane compound and/or condensate thereof is greater than the other. It is especially preferable to adjust the equivalent ratio to less than 0.8 or not less than 1.2.

Resin (A) can be produced by, for example, feeding and heating the above components to carry out a transesterification reaction while distilling off the alcohol produced. The reaction temperature is about 50 to about 130° C., and preferably about 70 to about 110° C., and the total reaction time is about 1 to about 15 hours.

In the transesterification reaction, known transesterification catalysts that do not cause opening of epoxy rings can be used to promote the reaction. Such transesterification catalysts include, for example, lithium, sodium, potassium, rubidium, cesium, magnesium, calcium, barium, strontium, zinc, aluminum, titanium, cobalt, germanium, tin, lead, antimony, arsenic, cerium, boron, cadmium, manganese and like metals, and oxides, organic acid salts, halides, alkoxides, etc. of such metals. Among these, organotin compounds and organic acid salts of tin are preferable, with dibutyltin dilaurate being especially preferable.

The above reaction can also be performed in a solvent. The solvent is not limited as long as it is an organic solvent that dissolves hydroxy-containing epoxy resins, hydrolyzable silane compounds and condensates of hydrolyzable silane compounds. Preferable examples of such organic solvents include aprotic polar solvents, such as dimethylformamide, dimethylacetamide, tetrahydrofuran, methyl ethyl ketone, etc.

Resin (A) thus obtained comprises as a main component a hydroxy-containing epoxy resin in which hydroxy groups have been modified with silane, but the hydroxy-containing epoxy resin, hydrolyzable silane compound and/or condensate thereof may remain partially unreacted in Resin (A). The unreacted hydrolyzable silane compound and/or condensate thereof may be converted into silica by hydrolysis and polycondensation.

Resin (B)

Resin (B) is not limited as long as it contains, per molecule, an average of at least one functional group that is reactive with the epoxy group in Resin (A). Examples of such resins include those used as curing agents for epoxy resins.

Specific examples include carboxy-containing vinyl polymers, carboxy-containing polyester resins and like carboxylic acid resins; adipic acid, trimellitic acid, trimellitic anhydride and like polycarboxylic acid compounds; dicyandiamide and like amide compounds; adipic acid dihydrazide and like carboxylic acid dihydrazide compounds; imidazoline compounds, imidazole compounds, phenol resins and like epoxy crosslinking agents.

Among these, carboxy-containing vinyl polymers and carboxy-containing polyester resins are preferable. More specific examples include copolymers having an average of at least one carboxy group per molecule, obtained by copolymerizing carboxy-containing polymerizable monomers and optionally other polymerizable monomers.

Carboxy-containing polymerizable monomers are compounds having carboxy group(s) and polymerizable unsaturated bond(s) in their molecules, and include, for example, acrylic acid, methacrylic acid, maleic acid, itaconic acid, crotonic acid, etc.

Other polymerizable monomers are compounds that are copolymerizable with carboxy-containing polymerizable monomers and have polymerizable unsaturated bond(s) in their molecules. Examples of such compounds include methyl (meth)acrylate, ethyl (meth)acrylate, butyl (meth) acrylate, cyclohexyl (meth)acrylate, 2-ethylhexyl (meth) acrylate, lauryl (meth)acrylate, stearyl (meth)acrylate, decyl acrylate, and like $C_{1-24}$ alkyl and cycloalkyl esters of (meth) acrylic acid; styrene, vinyltoluene, vinyl propionate, α-methylstyrene, vinyl acetate, (meth)acrylonitrile, vinyl propionate, vinyl pivalate, Veova monomers (Shell Chemical Co.) and like vinyl monomers; 2-hydroxyethyl (meth)acrylate, hydroxypropyl (meth)acrylate, and like $C_{1-8}$ hydroxyalkyl esters of (meth)acrylic acid; etc.

Such acrylic resins and vinyl resins may have a number average molecular weight of 5000 to 40000.

Examples of carboxy-containing polyester resins include polyester resins obtained by esterification of polyhydric alcohols with polybasic acids.

Polyhydric alcohols are compounds having at least two alcoholic hydroxy groups per molecule, and include, for example, ethylene glycol, diethylene glycol, propylene glycol, butanediol, pentanediol, 2,2-dimethylpropanediol, glycerol, trimethylolpropane, pentaerythritol, etc. Polybasic acids are compounds having at least two carboxy groups per molecule, and include, for example, phthalic acid, isophthalic acid, tetrahydrophthalic acid, hexahydrophthalic acid, maleic acid, succinic acid, adipic acid, sebacic acid, trimellitic acid, pyromellitic acid and anhydrides thereof, etc. In the esterification of polyhydric alcohols with polybasic acids, when necessary, monohydric alcohols can be used as part of the alcohol component, and monobasic acids such as benzoic acid, t-butyl benzoic acid, etc., can be used as part of the acid component. Polyester resins also include those modified with castor oil, tung oil, safflower oil, soybean oil, flaxseed oil, tall oil, coconut oil and like oils, and fatty acids thereof. Such polyester resins may have a number average molecular weight of 500 to 10000. Polyester resins having an average of at least one carboxy group per molecule can be used.

The proportions of Resins (A) and (B) are preferably 95 to 5 wt. %, and more preferably 80 to 50 wt. %, of Resin (A), and preferably 5 to 95 wt. %, and more preferably 20 to 50 wt. %, of Resin (B), based on the total amount (resin solids content) of these resins.

When the proportion of Resin (A) is less than 5 wt. %, low heat resistance results, whereas when it is over 95 wt. %, processability, mechanical properties, etc., become poor.

The optical waveguide-forming curable resin composition of the present invention may contain, in addition to Resins (A) and (B), epoxy resins other than Resin (A), as required. Specific examples of usable epoxy resins include bisphenol-type epoxy resins; orthocresol novolac-type epoxy resins, phenol novolac-type epoxy resins and like novolac-type epoxy resins; glycidyl ester-type epoxy resins obtained by reacting polybasic acids such as phthalic acid, dimer acid, etc. with epichlorohydrin; glycidyl amine-type epoxy resins obtained by reacting polyamines such as diaminodiphenylmethane, isocyanuric acid, etc. with epichlorohydrin; linear aliphatic epoxy resins and alicyclic epoxy resins obtained by oxidizing olefin bonds with peracids such as peracetic acid; etc.

The resin composition of the present invention may further contain, for example, fillers, coloring agents, leveling agents, heat-resistant stabilizers, discoloration preventing agents, antioxidants, organic solvents, mold releasing agents, surface treating agents, flame retardants, viscosity modifiers, plasticizers, antimicrobial agents, mildew-proofing agents, antifoaming agents, coupling agents, etc., as required.

The optical waveguide-forming curable resin composition of the present invention can be used in the form of a liquid obtained by dissolving or dispersing Resin (A) and (B) in a solvent such as water, an organic solvent or the like. Usable organic solvents include, for example, ketones, esters, ethers, cellosolves, aromatic hydrocarbons, alcohols, halogenated hydrocarbons, ketonic organic solvents, aromatic organic solvents, aliphatic organic solvents, and mixed organic solvents of two or more of these.

A cured resin article that is suitable for forming an optical waveguide can be obtained by applying the curable resin composition of the present invention to a substrate, and thereafter performing a first heating at a temperature at which hydrolyzable silyl groups in Resin (A) are polymerized through hydrolysis and condensation, and then performing a second heating at a temperature at which epoxy groups in Resin (A) react with functional groups in Resin (B).

The first heating is preferably performed at 60 to 140° C., and more preferably 70 to 140° C. When the first heating temperature is lower than 60° C., hydrolysis and condensation of hydrolyzable silyl groups are unlikely to occur, making it difficult to form a silica component. As a result, the cured resin article has low heat resistance. When the first heating temperature is higher than 140° C., an epoxy curing reaction of Resin (A) occurs simultaneously with the hydrolysis, and methanol formed by the hydrolysis remain as bubbles or the like. As a result, the cured resin article has low heat resistance, poor transparency, etc.

The temperature for the second heating varies depending on the types, proportions, etc., of the resins, and is preferably higher than 140° C. When the second heating temperature is not higher than 140° C., it is difficult for the reaction of Resin (A) with Resin (B) to occur.

The optical waveguide-forming curable dry film of the present invention is a film formed using the curable resin composition of the present invention. A laminate comprising the curable dry film of the present invention formed on a base film can be obtained by applying or printing the curable resin composition of the present invention on a base film, followed by removing the solvent. The curable dry film can be affixed to a surface of a substrate by bonding the laminate by applying heat and/or pressure and then peeling off the base film. Alternatively, the base film may be first peeled off from the laminate so that the remaining curable dry film can be bonded to a substrate by applying heat and/or pressure.

Usable base films include, for example, films of polyethylene terephthalate, aramid, Kapton, polymethylpentene, polyethylene, polypropylene, etc., among which polyethylene terephthalate films are preferable to achieve low cost and good properties of the dry film. The base film preferably has a thickness of 1 μm to 10 mm, and more preferably 1 μm to 1 mm.

The curable resin composition can be applied or printed on the base film by roller methods, spray methods, silk screen methods, etc. The thickness of the dry film can be suitably selected according to the optical waveguide to be produced, and is preferably 1 μm to 2 mm, and more preferably 1 μm to 1 mm.

The optical waveguide-forming curable dry film of the present invention preferably has a softening temperature within the range of 0° C. to 300° C., and more preferably within the range of 10° C. to 250° C. When the dry film has a softening temperature lower than 0° C., it easily adheres and causes difficulties in handling such as winding. Further, since the dry film is usually heated for bonding to a substrate, it is softened by the heating and becomes sticky when having a softening temperature lower than 0° C., possibly resulting in extremely difficult bonding operation and/or formation of bubbles after bonding. When the dry film has a softening temperature higher than 300° C., bonding may be difficult. Further, when a dry film with a softening temperature higher than 300° C. is bonded to form an upper cladding layer on the surfaces of the core and lower cladding layer for producing an optical waveguide, a gap may be formed between the upper cladding layer and the projection made by the core, and poor transmission properties may result.

As used herein, the softening temperature is determined using a thermomechanical analyzer, from the thermal deformation behavior of a 1 mm thick sheet. Specifically, a load of 49 g is applied to a quartz needle placed on the sheet; the sheet is heated at a rate of 5° C./min; and the temperature at which the needle penetrates into the sheet to a depth of 0.635 mm is defined as the softening temperature. Examples of usable thermomechanical analyzers include those commercially available from Du Pont.

A cured resin article suitable for forming an optical waveguide can be obtained by bonding the curable dry film of the present invention to a substrate, performing a first heating at a temperature at which hydrolyzable silyl groups in Resin (A) are polymerized through hydrolysis and condensation (e.g., a temperature mentioned above), and then performing a second heating at a temperature at which epoxy groups in Resin (A) react with functional groups in Resin (B) (e.g., a temperature mentioned above).

The optical waveguide of the present invention comprises a lower cladding layer (I), a core (II) and an upper cladding layer (III), and at least one of (I), (II) and (III) is formed using the optical waveguide-forming curable resin composition or dry film described above.

In the optical waveguide of the present invention, all of the lower cladding layer (I), core (II) and upper cladding layer (III) may be formed using the curable resin composition of the present invention, or all of these components (I), (II) and (III) may be formed using the curable dry film of the present invention. Alternatively, the curable resin composition and curable dry film can be combined to produce the optical waveguide of the present invention. It is also possible to use known compositions and/or dry films for part of the optical waveguide.

The lower cladding layer (I), core (II) and upper cladding layer (III) are described below.

Lower Cladding Layer (I)

The lower cladding layer (I) may be formed using a known composition containing a resin such as a thermoplastic resin, curable resin or the like, but is preferably formed using the optical waveguide-forming curable resin composition or optical waveguide-forming curable dry film of the present invention.

Examples of thermoplastic resins include acrylic resins, epoxy resins, silicon resins, polycarbonate resins, siloxane resins, polyimide resins, polyurethane resins, oxetane resins, polyethersulfone resins, polyphenylsulfide resins, polyetherimide resins, polysulfone resins, polyether ketone resins, polyamide resins, polyethylene resins, polypropylene resins, polyethylene terephthalate resins, phenol novolac resins, ethylene-vinyl alcohol copolymers, ethylene-vinyl acetate copolymers, polystyrene resins, fluororesins, polybutylene terephthalate resins, polyacetal resins, polyethernitrile resins, polyamide resins, olefin-maleimide copolymers, aramid resins, liquid crystal polymers, polyether ketone resins, cyanate resins, etc.

Examples of curable resins include thermosetting resins, room temperature-curable resins, active energy ray-curable resins, etc.

Known thermosetting resins are usable, including, for example, combinations of base resins having heat-reactive functional groups, and curing agents having functional groups that are reactive with the heat-reactive functional groups. Also usable are self-crosslinking resins having N-methylol groups, N-alkoxymethylol groups, etc.

Examples of combinations of heat-reactive functional groups and functional groups reactive therewith include carboxy groups and epoxy groups (oxirane groups); carboxylic anhydrides and epoxy groups (oxirane groups); amino groups and epoxy groups (oxirane groups); carboxy groups and hydroxy groups; carboxylic anhydrides and hydroxy groups; blocked isocyanate groups and hydroxy groups; isocyanate groups and amino groups; etc.

Examples of room temperature-curable resins include oxidation-curable unsaturated resins, isocyanate-curable resins, etc.

Particularly preferable active energy ray-curable resins include resins containing as essential components compounds each having at least two ring-opening polymerizable functional groups per molecule, optionally in combination with active energy ray polymerization initiators; polymerizable unsaturated compounds, unsaturated resins, etc., optionally in combination with active energy ray polymerization initiators; and the like. Usable active energy ray-curable resins include those for use in the negative-type active energy ray-sensitive resin compositions described hereinafter. The active energy ray-curable resin composition can be cured by irradiating, with active energy rays, the entire surface of the film formed therefrom.

The lower cladding layer (I) can be formed by applying or printing, on an optical waveguide substrate, a solution or dispersion of a known resin composition as mentioned above or the resin composition of the present invention in an organic solvent, water or like solvent, followed by removing the solvent. After or while removing the solvent, the printed or applied composition can be cured or dried as required, by active energy ray irradiation or heating.

Alternatively, a solution or dispersion of a known resin composition as mentioned above or the resin composition of the present invention in an organic solvent, water or like solvent may be applied or printed on a base film, followed by removing the solvent, to form a dry film on the base film. After peeling off the base film, the dry film can be bonded to an optical waveguide substrate by applying heat and/or pressure to thereby form a lower cladding layer (I). Further alternatively, a laminate comprising a dry film layer formed on a base film may be bonded to an optical waveguide substrate by applying heat and/or pressure, followed by peeling off the base film, to thereby form a lower cladding layer (I) on a surface of the optical waveguide substrate.

The dry film layer bonded to a surface of an optical waveguide substrate may be cured, as required, by active energy ray irradiation, heating or the like to obtain a lower cladding layer (I).

From the viewpoint of environmental protection, safety, workability, etc., it is especially preferable to form the lower cladding layer (I) by using a dry film.

Further, from the viewpoint of durability, heat resistance, processability, optical transmission properties, etc., it is preferable to form the lower cladding layer (I) by curing the curable resin composition or dry film of the present invention.

Core (II)

The core (II) is formed on part of the surface of the lower cladding layer (I).

The core (II) can be formed using a known resin composition such as a thermoplastic resin composition, negative-type active energy ray-sensitive resin composition, positive-type active energy ray-sensitive resin composition or the like. It is preferable to use a negative-type active energy ray-sensitive resin composition or positive-type active energy ray-sensitive resin composition. Examples of thermoplastic resin compositions include those mentioned above for use in the lower cladding layer.

The core can also be formed using the optical waveguide-forming curable resin composition or optical waveguide-forming curable dry film of the present invention.

Negative-type active energy ray-sensitive resin compositions are such compositions that when films formed therefrom are cured by irradiation with energy rays such as ultraviolet rays, visible rays, heat rays, etc., the films become insoluble in developers and thereby form cores. Known such resin compositions can be used without limitation. Specifically, it is preferable to use, for example, an aqueous or organic solvent-based composition comprising as an essential component a compound having at least two ring-opening polymerizable functional groups per molecule, and optionally an active energy ray polymerization initiator; or an aqueous or organic solvent-based composition comprising a polymerizable unsaturated compound, unsaturated resin or the like, and optionally an active energy ray polymerization initiator.

Known aqueous or organic solvent-based positive-type active energy ray-sensitive resin compositions can be used without limitation, as long as films formed therefrom are decomposed when irradiated with energy rays such as ultraviolet rays, visible rays, heat rays, etc., so as to change the solubility of the irradiated portions of the films in developers and thereby form cores.

Examples of positive-type active energy ray-sensitive resin compositions include compositions containing, as a main component, a base resin such as acrylic resin having ion-forming groups, to which a quinonediazidesulfonic acid is linked via a sulfonic ester bond. Such compositions are disclosed in JP 61-206293 A, JP 7-133449 A, etc. These compositions are naphthoquinonediazide photosensitive compositions that make use of a reaction in which a quinonediazide group is photolyzed by light irradiation to form an indenecarboxylic acid via a ketene.

Examples of positive-type active energy ray-sensitive resin compositions also include compositions that make use of a mechanism such that when crosslinked films insoluble in alkaline or acid developers are formed by heating the compositions and then irradiated with light, the crosslinked structure is cleaved by the action of photoacid generators that generate acid groups upon irradiation with light, so that the irradiated portions become soluble in alkaline or acid developers. Such compositions are disclosed in JP 6-295064 A, JP 6-308733 A, JP 6-313134 A, JP 6-313135 A, JP 6-313136 A, JP 7-146552 A, etc.

Photoacid generators are compounds that generate acid upon exposure, and decompose resins by the catalytic action of the generated acid. Known photoacid generators are usable.

Known positive-type heat-sensitive resin compositions are usable, including, for example, resin compositions containing a heat-sensitive resin, ether bond-containing olefinically unsaturated compound and thermoacid generator. Such a composition is disclosed in J 12-187326 A.

To form the core (II) using such a resin composition, a solution or dispersion of the composition in an organic solvent, water or like solvent is applied or printed on the surface of the lower cladding layer (I), and the solvent is removed to form a film of the composition. The film is irradiated with active energy rays to form a core pattern, and then developed to remove the unirradiated portion when a negative-type active energy ray-sensitive resin composition is used, or remove the irradiated portion when a positive-type active energy ray-sensitive resin composition is used, thereby forming the core (II).

Alternatively, a solution or dispersion of the resin composition in an organic solvent, water or like solvent may be applied or printed on a base film, followed by removing the solvent, to form a dry film layer on the base film. Subsequently, the base film is peeled off, and the dry film is bonded on the lower cladding layer (I) by applying heat and/or pressure, thereby forming a film of the composition. Further alternatively, a laminate comprising a dry film layer formed on a surface of a base film may be bonded on the lower cladding layer (I) by applying heat and/or pressure, followed by peeling off the base film, to thereby form a film of the composition on the lower cladding layer (I).

The surface of the film of the composition was irradiated with active energy rays to form a core pattern, and then the film is developed to remove the unirradiated portion when a negative-type active energy ray-sensitive resin composition is used, or remove the irradiated portion when a positive-type active energy ray-sensitive resin composition is used, thereby forming the core (II).

Upper Cladding Layer (III)

The upper cladding layer (III) is formed using a curable resin composition or a dry film on the surfaces of the lower cladding layer (I) and core (II).

The upper cladding layer (III) may be formed using a known composition containing a resin such as a thermoplastic resin, curable resin or the like, and it is especially preferable to form the layer (III) using the optical waveguide-forming curable resin composition or curable dry film of the present invention.

Examples of resin compositions and dry films that can be used for forming the upper cladding layer (III) include those mentioned for use in the lower cladding layer (I).

The upper cladding layer (III) can be formed using a dry film in the following manner. A solution or dispersion of a known resin composition as mentioned above or the resin composition of the present invention in an organic solvent, water or like solvent is applied or printed on a base film, and then the solvent is removed to form a dry film layer on a surface of the base film. The base film is then peeled off, and the dry film is bonded to the surfaces of the lower cladding layer (I) and core (II) by applying heat and/or pressure to form the upper cladding layer (III). Alternatively, a laminate comprising a dry film layer formed on a surface of a base film may be bonded to the surfaces of the lower cladding layer (I) and core (II) by applying heat and/or pressure, followed by peeling off the base film, to thereby form the upper cladding layer (III).

When necessary, the upper cladding layer (III) formed may be cured or dried by active energy ray irradiation, heating or the like.

The upper cladding layer (III), as a dry film before being bonded to the surfaces of the lower cladding layer (I) and core (II), preferably has a softening temperature within the range of 0° C. to 300° C., and more preferably within the range of 10° C. to 250° C. When the dry film has a softening temperature lower than the above, the dry film is softened and becomes sticky when heated for bonding, possibly making the bonding operation extremely difficult and/or forming bubbles after bonding. When the dry film has a softening temperature higher than the above, bonding of the dry film may be difficult.

The softening temperature of the dry film for forming the upper cladding layer (III) is preferably lower than that of the core (II), particularly preferably by 10° C. or more.

Base films that can be used for forming the dry film include those of polyethylene terephthalate, aramid, Kapton, polymethylpentene, polyethylene, polypropylene, etc. It is preferable to use a polyethylene terephthalate film to achieve low cost and good properties of the dry film. The base film preferably has a thickness of 1 μm to 10 mm, and more preferably 1 μm to 1 mm.

In the optical waveguide of the present invention, it is preferable that the relative refractive index difference between the core (II) and whichever of the lower cladding layer (I) and upper cladding layer (III) that has the higher refractive index, be at least 0.1%.

As used herein, the relative refractive index difference is defined by the following equation (1).

$$\text{Relative refractive index difference (\%)}=[(n_1-n_2)/n_2]\times 100 \quad (1)$$

wherein $n_1$ is the refractive index of the core (II); and $n_2$ is the refractive index of whichever of the lower cladding layer (I) and upper cladding layer (III) that has the higher refractive index. These refractive indices are measured using an Abbe refractometer with light having a wavelength of 850 nm.

In order to obtain the above relative refractive index difference, the refractive index of the core (II) needs to be greater than the refractive indices of both the lower cladding layer (I) and upper cladding layer (III).

In the optical waveguide of the present invention, it is usually preferable that, for light having a wavelength of 400 to 1700 nm, the core (II) have a refractive index of 1.420 to 1.650, and that each of the lower cladding layer (I) and upper cladding layer (III) have a refractive index of 1.400 to 1.648. The refractive indices can be adjusted by suitably selecting the resins, additives, proportions thereof, etc.

In the optical waveguide of the present invention, the thicknesses of the lower cladding layer (I), upper cladding layer (III) and core (II) are not limited, and are preferably, for example, each 1 to 200 μm. The width of the core (II) is also not limited, and is preferably, for example, 1 to 200 μm.

Process of Producing Optical Waveguide

The optical waveguide of the present invention may be produced, for example, in the following manner. The cladding layer (I) is formed on an optical waveguide substrate; the core (II) is then formed on the surface of the lower cladding layer (I); and thereafter the dry film is bonded to the surfaces of the lower cladding layer (I) and core (II) by applying heat and/or pressure to form the upper cladding layer (III).

Examples of optical waveguide substrates include silicon substrates, quartz substrates, polyimide substrates, PET substrates, liquid crystal polymer substrates, copper foil, copper clad laminates, substrates with circuits formed thereon, etc.

To form the upper cladding layer (III), the dry film formed on a base film is placed so that the surface of the dry film comes into contact with the surfaces of the core (II) and lower cladding layer (I); and suitable heat and pressure are applied to the surface of the base film at a temperature at least 10° C. higher than the softening temperature of the dry film, by a pressure-bonding method such as atmospheric-pressure hot roll bonding, vacuum hot roll bonding, vacuum hot press bonding, etc. The base film is then peeled off from the dry film to transfer the dry film onto the core (II) and lower cladding layer (I), thereby forming an upper cladding layer on the surfaces of the core (II) and lower cladding layer (I).

When the upper cladding layer (III) is formed using a curable resin composition, it is preferable to cure the layer (III) by heating or active energy ray irradiation.

When the curable resin composition of the present invention is used to form the upper cladding layer (III), the layer (III) can be cured by the first and second heatings as described above. The first heating causes the polymer (gel insoluble in organic solvents) formed from the hydrolyzable silane compound to chemically bond to Resin (A, thereby creating a sol-gel state. Subsequently, the second heating causes epoxy groups in Resin (A) to react with functional groups in Resin (B), to thereby give a cured resin article.

Usable active energy rays include visible rays, ultraviolet rays, infrared rays, x-rays, α-rays, β-rays, γ-rays, etc. It is preferable to use, for example, a high-pressure mercury lamp, low-pressure mercury lamp, metal halide lamp, excimer lamp or the like, as an irradiation device. There is no limitation on the exposure intensity. It is preferable to perform exposure by irradiation with ultraviolet rays having a wavelength of 200 to 440 nm and an illuminance of 1 to 500 $mW/cm^2$ at an exposure intensity of 10 to 5000 $mJ/cm^2$.

Effects of the Invention

The present invention exhibits the following remarkable effects.

The use of the optical waveguide-forming curable resin composition or dry film of the present invention makes it possible to form an optical waveguide having high heat resistance, excellent mechanical strength, high transparency, low thermal expansion, low transmission loss, and other excellent characteristics.

When the hydrolyzable silyl-containing silane-modified epoxy resin (A) contained in the curable resin composition of the present invention is a reaction product of a hydroxy-containing epoxy resin with a hydrolyzable silane compound and/or a condensate thereof, the heat resistance, mechanical strength and transparency of the resulting optical waveguide are particularly excellent, and the thermal expansion and transmission loss thereof are remarkably low.

When Resin (B) contained in the curable resin composition of the present invention is a carboxy-containing resin, its carboxyl groups react with epoxy groups in Resin (A) to thereby achieve further crosslinking. Thus, the heat resistance and mechanical strength of the resulting optical waveguide are excellent, and the thermal expansion thereof is remarkably low.

To obtain a cured resin article for use in the optical waveguide of the present invention, a first heating is performed at a temperature at which hydrolyzable silyl groups in the hydrolyzable silyl-containing silane-modified epoxy resin (A) are polymerized through hydrolysis and condensation, and then a second heating is performed at a temperature at which epoxy groups in Resin (A) react with functional groups in Resin (B). As a result, a polymeric material with a high crosslinking density can be formed, thereby giving an optical waveguide with high heat resistance and excellent mechanical strength, and remarkably low thermal expansion.

When the optical waveguide-forming curable dry film of the present invention is bonded to the surfaces of the core and lower cladding layer by applying heat and/or pressure, no gap is formed between the projection made by the core and the upper cladding layer made of the dry film, and therefore the resulting optical waveguide has excellent transmission properties. Further, when the dry film has a softening temperature within the range of 0° C. to 300° C., the above effects are further improved.

Use of the optical waveguide-forming curable resin composition or curable dry film of the present invention makes it easy to adjust the relative refractive index difference between the core (II) and whichever of the lower cladding layer (I) and upper cladding layer (III) that has the higher refractive index, to at least 0.1%. Adjusting the relative refractive index difference to at least 0.1% reduces the optical transmission loss.

The optical waveguide of the present invention can be advantageously used for connecting optical devices, such as optical integrated circuits, optical modulators, optical switches, optical connectors, optical branching and coupling devices, thin film devices, etc., to optical fibers.

BEST MODE FOR CARRYING OUT THE INVENTION

The following Production Examples, Examples and Comparative Examples are provided to illustrate the present invention in further detail.

PRODUCTION EXAMPLE 1

Production of Silane-modified Epoxy Resin (A-1)

A bisphenol A-type epoxy resin (850 g; epoxy equivalent: 475 g/eq.; a product of Tohto Kasei Co., Ltd.; tradename "Epotohto YD-011") was mixed with dimethylformamide (850 g) and dissolved therein at 90° C. A tetramethoxysilane condensate (419.4 g; a product of Tama Chemicals Co., Ltd.; tradename "Methyl Silicate 51") and dibutyltin dilaurate (2 g) as a catalyst were added, and a reaction was carried out at 90° C. for 5 hours to obtain silane-modified epoxy resin (A-1). In the starting materials, the weight of the hydrolyzable methoxysilane calculated as silica/the weight of the epoxy resin=0.25; and the equivalent of the methoxy groups in the hydrolyzable methoxysilane/the equivalent of the hydroxy groups in the epoxy resin=4.6.

PRODUCTION EXAMPLE 2

Production of Silane-modified Epoxy Resin (A-2)

A bisphenol A-type epoxy resin (800 g; epoxy equivalent: 475 g/eq.; a product of Tohto Kasei Co., Ltd.; tradename "Epotohto YD-011") was mixed with dimethylformamide (800 g) and dissolved therein at 90° C. A tetramethoxysilane condensate (523.5 g; a product of Tama Chemicals Co., Ltd.; tradename "Methyl Silicate 51") and dibutyltin dilaurate (2 g) as a catalyst were added, and a reaction was carried out at 90° C. for 5 hours to obtain silane-modified epoxy resin (A-2). In the starting materials, the weight of the hydrolyzable methoxysilane on a silica basis/the weight of the epoxy resin=0.33; and the equivalent of the methoxy groups in the hydrolyzable methoxysilane/the equivalent of hydroxy groups in the epoxy resin=6.1.

PRODUCTION EXAMPLE 3

Production of Polycarboxylic Acid Resin (B-1)

Acrylic acid (72 g), methyl methacrylate (518 g) and ethyl methacrylate (418 g) were radically polymerized in a toluene solvent in the presence of an azobisvaleronitrile initiator to obtain polycarboxylic acid resin (B-1) having an average molecular weight of 5000.

PRODUCTION EXAMPLE 4

Production of Optical Waveguide-forming Curable Resin Composition (C-1)

Silane-modified epoxy resin (A-1) (500 g as solids) and polycarboxylic acid resin (B-1) (500 g as solids) were mixed together to obtain optical waveguide-forming curable resin composition (C-1).

PRODUCTION EXAMPLE 5

Production of Optical Waveguide-forming Curable Resin Composition (C-2)

Silane-modified epoxy resin (A-2) (500 g as solids) and polycarboxylic acid resin (B-1) (500 g as solids) were mixed together to obtain optical waveguide-forming curable resin composition (C-2).

PRODUCTION EXAMPLE 6

Production of Optical Waveguide-forming Curable Dry Film (C-3)

Optical waveguide-forming curable resin composition (C-1) was applied on a polyethylene terephthalate film (film thickness: 25 μm) with a knife edge coater, and dried at 80° C. for 30 minutes to obtain optical waveguide-forming curable dry film (C-3).

PRODUCTION EXAMPLE 7

Production of Optical Waveguide-forming Curable Dry Film (C-4)

Optical waveguide-forming curable resin composition (C-2) was applied on a polyethylene terephthalate film (film thickness: 25 μm) with a knife edge coater, and dried at 80° C. for 30 minutes to obtain optical waveguide-forming curable dry film (C-4).

PRODUCTION EXAMPLE 8

Production of Optical Waveguide-forming Curable Dry Film (C-5)

A bisphenol A-type epoxy resin (750 g as solids; epoxy equivalent: 475 g/eq.; a product of Tohto Kasei Co., Ltd.; tradename "Epotohto YD-011") and polycarboxylic acid resin (B-1) (250 g as solids) were mixed together to obtain an optical waveguide-forming curable resin composition. Subsequently, the composition was applied over a polyethylene terephthalate film (film thickness: 25 μm) with a knife edge coater, and dried at 80° C. for 30 minutes to obtain comparative optical waveguide-forming curable dry film (C-5).

PRODUCTION EXAMPLE 9

Production of Photocurable Resin Composition (D-1)

Dimethylolbutanoic acid (39.8 g), neopentyl glycol (13.5 g), trimethylhexamethylenediisocyanate (46.7 g) and dibutyltin dilaurate (500 ppm) as a reaction catalyst were added to a methyl ethyl ketone solvent, and a reaction was carried out at 75° C. for 12 hours to obtain a carboxy-containing urethane compound. Then, 61.5 g of the carboxy-containing urethane compound, Aronix 8100 (12.3 g; a tradename of Toagosei, Co., Ltd.), trimethylolpropane triacrylate (6.1 g), Epicoat EP-828EL (19.5 g; a tradename of Japan Epoxy Resin Co., Ltd.) and Irgacure 907 (0.6 g; a tradename of Ciba Speciality Chemicals Corp.) were added to and mixed with a methyl ethyl ketone solvent to obtain photocurable resin composition (D-1) as a homogeneous solution.

PRODUCTION EXAMPLE 10

Production of Photocurable Dry Film (D-2)

Photocurable resin composition (D-1) was applied over a polyethylene terephthalate film (film thickness: 25 μm) with a knife edge coater, and dried at 80° C. for 30 minutes to obtain photocurable dry film (D-2).

EXAMPLE 1

Production of Optical Waveguide (1) Formation of Lower Cladding Layer

Optical waveguide-forming curable resin composition (C-1) was applied to a surface of a silicon substrate by spin coating, and heated at 150° C. for 30 minutes to form a lower cladding layer with a thickness of 40 μm.

(2) Formation of Core

Subsequently, photocurable resin composition (D-1) was applied on the lower cladding layer by spin coating and dried at 80° C. for 30 minutes. The applied composition was cured by irradiation for 100 seconds with ultraviolet rays having a wavelength of 365 nm and an illuminance of 10 $mW/cm^2$, via a photomask with a pattern consisting of 30 μm-wide lines. The substrate with the ultraviolet ray-irradiated resin composition layer was immersed in a developer made of an aqueous 1.8 wt. % tetramethylammonium hydroxide solution to dissolve the unexposed portion of the resin composition layer, and post-baked at 150° C. for 30 minutes. A core with a pattern consisting of 30 μm-wide lines was thus formed.

(3) Formation of Upper Cladding Layer

Optical waveguide-forming curable resin composition (C-1) was applied to the top surfaces of the core and lower cladding layer by spin coating and dried at 100° C. for 30 minutes. The applied composition was then heated at 150° C. for 30 minutes to obtain an upper cladding layer with a thickness of 40 μm.

The obtained optical waveguide was evaluated with respect to bubbles, shrinkage, appearance and heat resistance, according to the following criteria, and, as a result, was rated as A in all of these respects.

Bubbles: A indicates no bubbles in the cured article; B, less than five bubbles in the cured article; and C, five or more bubbles in the cured article.

Shrinkage: A indicates no cracks in the cured article; B, some cracks in the cured article; and C, numerous cracks in the cured article.

Appearance: A indicates that the cured article was transparent; B, the cured article was clouded; and C, the cured article was blushed.

Heat resistance: A indicates that no cracks or peeling was observed after performing 20 heat cycles of 0° C. for 1 hour and 100° C. for 1 hour; B, slight abnormalities such as cracks and/or peeling were observed after performing the above 20 heat cycles; and C, conspicuous abnormalities such as cracks and/or peeling were observed after performing the above 20 heat cycles.

Further, the refractive indices of film samples obtained from the resin compositions used for forming the cladding layers and core were measured at 23° C. using a multi-wavelength Abbe refractometer "DR-M4" (a product of Atago Co., Ltd.) with an interference filter having a wavelength of 850 nm. Using the refractive indices thus obtained, the relative refractive index difference (%) was calculated according to equation (1) shown above. The relative refractive index difference between the core and the cladding layers was at least 0.1%.

EXAMPLE 2

Production of Optical Waveguide (1) Formation of Lower Cladding Layer

Optical waveguide-forming curable resin composition (C-2) was applied over a surface of a silicon substrate by spin coating, and heated at 150° C. for 30 minutes to form a lower cladding layer with a thickness of 40 μm.

(2) Formation of Core

Photocurable resin composition (D-1) was applied on the lower cladding layer by spin coating and dried at 80° C. for 30 minutes. The applied composition was cured by irradiation for 100 seconds with ultraviolet rays having a wavelength of 365 nm and an illuminance of 10 $mW/cm^2$, via a photomask with a pattern consisting of 30 μm-wide lines. The substrate with the ultraviolet ray-irradiated resin composition layer was immersed in a developer made of an aqueous 1.8 wt. % tetramethylammonium hydroxide solution to dissolve the unexposed portion of the resin composition layer, and post-baked at 150° C. for 30 minutes. A core with a pattern consisting of lines with a width of 30 μm was thus formed.

(3) Formation of Upper Cladding Layer

Optical waveguide-forming curable resin composition (C-2) was applied to the top surfaces of the core and lower cladding layer by spin coating and dried at 100° C. for 30 minutes. The applied composition was then heated at 150° C. for 30 minutes to obtain an upper cladding layer with a thickness of 40 μm.

The obtained optical waveguide was evaluated with respect to bubbles, shrinkage, appearance and heat resistance according to the above criteria, and, as a result, was rated as A in all of these respects.

The relative refractive index difference between the core and the cladding layers was at least 0.1%.

EXAMPLE 3

Production of Optical Waveguide (1) Formation of Lower Cladding Layer

Optical waveguide-forming curable dry film (C-3) was transferred onto a surface of a silicon substrate by atmospheric-pressure hot roll bonding (temperature: 100° C.), and the polyethylene terephthalate film was peeled off. The dry film was then heated at 150° C. for 30 minutes to form a lower cladding layer with a thickness of 40 μm.

(2) Formation of Core

Photocurable dry film (D-2) was transferred onto the lower cladding layer by atmospheric-pressure hot roll bonding (temperature: 100° C.), and the polyethylene terephthalate film was peeled off. The dry film was then cured by irradiation for 100 seconds with ultraviolet rays having a wavelength of 365 nm and an illuminance of 10 $mW/cm^2$, via a photomask with a pattern consisting of 30 μm-wide lines. The substrate with the ultraviolet ray-irradiated resin composition layer was immersed in a developer made of an aqueous 1.8 wt. % tetramethylammonium hydroxide solution, to dissolve the unexposed portion of the resin composition layer, and post-baked at 150° C. for 30 minutes. A core with a pattern consisting of 30 μm-wide lines was thus formed.

(3) Formation of Upper Cladding Layer

Optical waveguide-forming curable dry film (C-3) was transferred onto the top surfaces of the core and lower cladding layer by atmospheric-pressure hot roll bonding (temperature: 100° C.) and the polyethylene terephthalate film was peeled off. The dry film was then heated at 150° C. for 30 minutes to form an upper cladding layer with a thickness of 40 μm.

The obtained optical waveguide was evaluated with respect to bubbles, shrinkage, appearance and heat resistance according to the above criteria, and, as a result, was rated as A in all of these respects.

The relative refractive index difference between the core and the cladding layers was at least 0.1%.

EXAMPLE 4

Production of Optical Waveguide (1) Formation of Lower Cladding Layer

Optical waveguide-forming curable dry film (C-4) was transferred onto a surface of a silicon substrate by atmospheric-pressure hot roll bonding (temperature: 100° C.) and the polyethylene terephthalate film was peeled off. The dry film was then heated at 150° C. for 30 minutes to form a lower cladding layer with a thickness of 40 μm.

(2) Formation of Core

Photocurable dry film (D-2) was transferred onto the surface of the lower cladding layer by atmospheric-pressure hot roll bonding (temperature: 100° C.), and the polyethylene terephthalate film was peeled off. The dry film was then cured by irradiation for 100 seconds with ultraviolet rays having a wavelength of 365 nm and an illuminance of 10 $mW/cm^2$ via a photomask with a pattern consisting of 30 μm-wide lines. The substrate with the ultraviolet ray-irradiated resin composition layer was immersed in a developer made of an aqueous 1.8 wt. % tetramethylammonium hydroxide solution to dissolve the unexposed portion of the resin composition layer, and heated at 150° C. for 30 minutes. A core with a pattern consisting of 30 μm-wide lines was thus formed.

(3) Formation of Upper Cladding Layer

Optical waveguide-forming curable dry film (C-4) was transferred onto the top surfaces of the core and lower cladding layer by atmospheric-pressure hot roll bonding (temperature: 100° C.), and the polyethylene terephthalate film was peeled off. The dry film was then heated at 150° C. for 30 minutes to form an upper cladding layer with a thickness of 40 μm.

The obtained optical waveguide was evaluated with respect to bubbles, shrinkage, appearance and heat resistance according to the above criteria, and, as a result, was rated as A in all of these respects.

The relative refractive index difference between the core and the cladding layers was at least 0.1%.

COMPARATIVE EXAMPLE 1

Production of Optical Waveguide (1) Formation of Lower Cladding Layer

Optical waveguide-forming curable dry film (C-5) was transferred onto a surface of a silicon substrate by atmospheric-pressure hot roll bonding (temperature: 100° C.), and the polyethylene terephthalate film was peeled off. The dry film was then heated at 150° C. for 30 minutes to form a lower cladding layer with a thickness of 40 μm.

(2) Formation of Core

Photocurable dry film (D-2) was transferred onto the lower cladding layer by atmospheric-pressure hot roll bonding (temperature: 100° C.), and the polyethylene terephthalate film was peeled off. The dry film was then cured by irradiation for 100 seconds with ultraviolet rays having a wavelength of 365 nm and an illuminance of 10 $mW/cm^2$, via a photomask with a pattern consisting of 30 μm-wide lines. The substrate with the ultraviolet ray-irradiated resin composition layer was immersed in a developer made of an aqueous 1.8 wt. % tetramethylammonium hydroxide solution to dissolve the unexposed portion of the resin composition, and heated at 150° C. for 30 minutes. A core with a pattern consisting of 30 μm-wide lines was thus formed.

(3) Formation of Upper Cladding Layer

Optical waveguide-forming curable dry film (C-5) was transferred onto the top surfaces of the core and lower cladding layer by atmospheric-pressure hot roll bonding (temperature: 100° C.), and the polyethylene terephthalate film was peeled off. The dry film was then heated at 150° C. for 30 minutes to form an upper cladding layer with a thickness of 40 μm.

The obtained optical waveguide was evaluated with respect to bubbles, shrinkage, appearance and heat resistance according to the above criteria. As a result, it was rated as A with respect to bubbles, shrinkage and appearance, but as C with respect to heat resistance.

The invention claimed is:

1. A curable resin composition for forming an optical waveguide, the composition comprising a hydrolyzable silyl-containing silane-modified epoxy resin (A) having an average of at least one hydrolyzable silyl group and an average of at least one epoxy group per molecule; and a resin (B) having, per molecule, an average of at least one functional group that is reactive with an epoxy group;

the hydrolyzable silyl-containing silane-modified epoxy resin (A) being a reaction product of a bisphenol-type epoxy resin with at least one member selected from the group consisting of tetraalkoxysilanes, alkyltrialkoxysilanes and condensates thereof.

2. The curable resin composition according to claim 1, wherein the resin (B) is a carboxy-containing resin.

3. A cured resin article for forming an optical waveguide, the article being obtained by applying the curable resin composition according to claim 1 to a substrate, performing a first heating at a temperature at which hydrolyzable silyl groups in the hydrolyzable silyl-containing silane-modified epoxy resin (A) are polymerized through hydrolysis and condensation, and performing a second heating at a temperature at which epoxy groups in the resin (A) react with functional groups in the resin (B).

4. A curable dry film for forming an optical waveguide, the dry film being formed using an optical waveguide-forming curable resin composition comprising a hydrolyzable silyl-containing silane-modified epoxy resin (A) having an average of at least one hydrolyzable silyl group and an average of at least one epoxy group per molecule, and a resin (B) having, per molecule, an average of at least one functional group that is reactive with an epoxy group;

the hydrolyzable silyl-containing silane-modified epoxy rein (A) being a reaction product of a bisphenol-type epoxy resin with at least one member selected from the group consisting of tetraalkoxysilanes, alkyltrialkoxysilanes and condensates thereof.

5. The curable dry film according to claim 4 which has a softening temperature within a range of 0° C. to 300° C.

6. A cured resin article for forming an optical waveguide, the article being obtained by bonding the dry film according to claim 4 to a substrate, performing a first heating at a temperature at which hydrolyzable silyl groups in the hydrolyzable silyl group-containing silane-modified epoxy resin (A) are polymerized through hydrolysis and condensation, and performing a second heating at a temperature at which epoxy groups in the resin (A) react with functional groups in the resin (B).

7. An optical waveguide comprising a lower cladding layer (I) a core (II) and an upper cladding layer (III), wherein at least one of (I), (II) and (III) is formed using the curable resin composition according to claim 1.

8. The optical waveguide according to claim 7, wherein the relative refractive index difference between the core (II) and whichever of the lower cladding layer (I) and upper cladding layer (III) that has the higher refractive index, is at least 0.1%.

9. An optical waveguide comprising a lower cladding layer (I), a core (II) and an upper cladding layer (III), wherein at least one of (I), (II) and (III) is formed using the dry film according to claim 4.

10. The optical waveguide according to claim 9, wherein the relative refractive index difference between the core (II) and whichever of the lower cladding layer (I) and upper cladding layer (III) that has the higher refractive index, is at least 0.1%.

11. An optical waveguide comprising a lower cladding layer (I) a core (II) and an upper cladding layer (III), wherein at least one of (I), (II) and (III) is formed using the cured resin article according to claim 4.

12. The optical waveguide according to claim 11, wherein the relative refractive index difference between the core (II) and whichever of the lower cladding layer (II) and upper cladding layer (III) that has the higher refractive index, is at least 0.1%.

13. An optical waveguide comprising a lower cladding layer (I), a core (II) and an upper cladding layer (III), wherein at least one of (I), (II) and (III) is formed using the cured resin article according to claim 6.

14. The optical waveguide according to claim 13, wherein the relative refractive index difference between the core (II) and whichever of the lower cladding layer (I) and upper cladding layer (III) that has the higher refractive index, is at least 0.1%.

* * * * *

UNITED STATES PATENT AND TRADEMARK OFFICE

CERTIFICATE OF CORRECTION

PATENT NO. : 7,466,893 B2
APPLICATION NO. : 10/589723
DATED : December 16, 2008
INVENTOR(S) : Takahiro Higuchi et al.

It is certified that error appears in the above-identified patent and that said Letters Patent is hereby corrected as shown below:

On the Title Page:

Insert item: --(30) Foreign Application Priority Data

JAPAN 2004-49825 February 25, 2004--

Signed and Sealed this

Twenty-third Day of February, 2010

David J. Kappos
*Director of the United States Patent and Trademark Office*